(12) United States Patent
Takai et al.

(10) Patent No.: US 8,443,720 B2
(45) Date of Patent: May 21, 2013

(54) CONTINUOUS CURDING MACHINE FOR TOFU PRODUCTS

(75) Inventors: Toichiro Takai, Ishikawa-ken (JP); Toshiaki Shinde, Ishikawa-ken (JP)

(73) Assignee: Takai Tofu & Soymilk Equipment Co., Ishikawa-Gun, Ishikawa-Ken (JP)

( * ) Notice: Subject to any disclaimer, the term of this patent is extended or adjusted under 35 U.S.C. 154(b) by 478 days.

(21) Appl. No.: 12/662,750

(22) Filed: May 3, 2010

(65) Prior Publication Data

US 2010/0275790 A1 Nov. 4, 2010

(30) Foreign Application Priority Data

May 1, 2009 (JP) ................................. 2009-112345

(51) Int. Cl.
*A23L 1/20* (2006.01)

(52) U.S. Cl.
USPC ................. 99/458; 99/456; 99/452; 99/443 C (58) Field of Classification Search
USPC ................. 99/456, 458, 459, 460, 452, 443 C
See application file for complete search history.

(56) References Cited

U.S. PATENT DOCUMENTS

| | | | | |
|---|---|---|---|---|
| 3,754,464 | A * | 8/1973 | Kaufman et al. ............... | 99/334 |
| 4,618,498 | A * | 10/1986 | Thulin ........................... | 426/275 |
| 5,688,542 | A * | 11/1997 | Tortosa ........................... | 426/36 |
| 5,957,042 | A * | 9/1999 | Iwamoto ........................ | 99/494 |
| 6,101,926 | A * | 8/2000 | Miyagawa et al. ............ | 99/330 |
| 6,119,589 | A * | 9/2000 | Hain et al. ..................... | 99/460 |
| 2003/0196560 | A1 * | 10/2003 | Sands et al. .................... | 99/423 |

FOREIGN PATENT DOCUMENTS

| | | |
|---|---|---|
| JP | S53-39507 | 10/1978 |
| JP | H06-48526 A | 2/1994 |
| JP | H06-16544 Y2 | 5/1994 |
| JP | H09-124122 A | 5/1997 |
| JP | 3483315 B2 | 10/2003 |
| JP | 3568193 | 6/2004 |
| JP | 2005-261369 A | 9/2005 |
| JP | 2005-299294 A | 10/2005 |
| JP | 2008-081318 A | 4/2008 |

OTHER PUBLICATIONS

Japan Patent Office, Office Action for JP 2009-112345 (now JP Patent 4512663 B1; Family of US 2010/0275790), Jul. 28, 2009.
Japan Patent Office, Office Action for JP 2009-112345 (now JP Patent 4512663 B1; Family of US 2010/0275790), Dec. 7, 2009.

* cited by examiner

*Primary Examiner* — Reginald L Alexander
(74) *Attorney, Agent, or Firm* — Manabu Kanesaka (57) ABSTRACT

The object of the present invention is to provide a continuous curding machine for tofu products, designed to be capable of manufacturing clean tofu products in that it will not cause a leakage of soymilk and seams and/or wrinkles on the tofu, sanitary and simple in mechanism, easy to perform transport of tofu to following processes, and capable of forming a deep coagulation compartment so as to enable "tatedori" (taking the depth of the coagulation compartment to be the longest side of the tofu). The machine is equipped with the conveyor belt C that transports coagulating coagulant-added soymilk as well as with a concave member 10 disposed underneath the belt. The belt C is conveyed as it is shaped into concave in accordance with the form of the said concave member 10 disposed underneath, and forms a coagulating compartment 10a, 10b.

7 Claims, 10 Drawing Sheets

Prior Art

Figure 7B

Prior Art

Figure 12
Continuous process

Figure 13
Continuous process

CONTINUOUS CURDING MACHINE FOR TOFU PRODUCTS

BACKGROUND OF THE INVENTION

1. The Field of the Invention

The present invention relates to a continuous curding machine for the continuous operation of the production of finished slices of bean curd before they are made into tofu products such as silken tofu, soft tofu, deep-fried tofu, thick-fried tofu, thin-fried tofu (tofu pouches), fried-tofu with vegetables, firm tofu, softer firm tofu, baked tofu, and frozen tofu.

2. The Description of Prior Art

An existing method for the production of tofu products involving coagulation of soymilk typically utilizes forming boxes in the case of low-volume production. In the case of large-volume production, however, tofu products are manufactured continuously where soymilk is coagulated as it is transported, instead of being coagulated and formed in the forming box. Having been formed, the bean curd is cut into, a given size for packaging. Various equipments have already been put in use for the above production process of tofu products. (see Patent Document 1, as JP 3483315B, to Patent Document 3, as JPh 53-39507B).

Patent Document 1 relates to a curding machine equipped with a main belt and a pair of sub belts each of which is placed at left and right ends of the main belt. Both the main belt and sub belts move at the same speed, and constitute a tub-shaped compartment for the coagulation of soymilk poured from the dispensing nozzle.

However, this method that uses a pair of left and right sidewalls, comprising the sub belts placed adjacent to the right and left ends of the main belt respectively, and moving at the same speed in the same direction as the latter, has disadvantages such as possible leakage of soymilk, unsanitary condition and low-performance due to a large number of driving parts required, and difficulty in maintaining accurate control over the entire set of independent parts that should move in a concerted manner.

Patent Document 2, as JP 3568193 B, relates to a curding machine equipped with an endless belt driven by a rotary roller and a flexible guiding member made of silicone rubber that is integrally attached over the endless conveyor as in the U-shape. This machine makes tofu by transporting the coagulating soymilk supplied into a compartment separated by the barrier panels placed at the rear and forefront of the endless conveyor as well as by the guiding member that forms left and right side walls.

However, this method has a problem from the viewpoint of production capability and installation area in that it has difficulty in providing a coagulation compartment that excels in terms of strength and flexibility because of the silicone rubber material used for the sidewalls.

Patent Document 3 is the embodiment pertaining to a curding machine and forming machine. According to the description of the forming machine, it is equipped with a lower caterpillar-like endless belt over which is placed a filtration cloth, and an upper caterpillar-like endless belt to which filtration cloth is also attached, where the latter is capable of moving upward and downward. A large number of erection panels, attached by hinges at each end of the endless belt, are erected along guiding rails at right and left, while the lower filtration cloth that moves along the upper and lower endless belt is shaped into a U-form.

The problem of this method described in Patent Document 3, however, is that because the lower filtration cloth is forced to be folded almost at a right angle by erection panels, the cloth tends to have wrinkles at and around the fold. Also, since the lower filtration cloth is ceaselessly and continuously folded and stressed, it tends to wear out quickly, making its useful year much shorter than average.

SUMMARY OF THE INVENTION

The problem with these conventional methods, including a continuous forming machine of tofu products using the filtration cloth folded as in concave and a continuous coagulation machine with sidewalls at right and left ends of the filtration cloth, is that it may cause leakage of soymilk from the juncture of the bottom of the concave and sidewalls. Moreover, such methods require a large number of moving parts, and may easily result in failure or cause unsanitary condition.

The method using a concave endless belt as described in Patent Document 2 employs a rigid metal that requires installment of large-radius axis rollers in the vicinity. For this reason, the equipment itself tends to become large. Also, when the tofu, having been cut into a given number after the coagulation process, has to be transferred to another machine for packaging, this transferring process can become bumpy due to the use of large-radius axis rollers. Moreover, in this method, it is difficult to obtain a formation of deep-set coagulation compartment, in other words, to have higher rubber sidewalls at left and right of the endless belt without making the machine itself larger in size. For instance, where the bean curd should be rectangular, this method can let the tofu formed and cut with its shorter side adjusted to the height (depth) of the side walls (called "hiradori") but not its longer side (called "tatedori.") That is, the "hiradori" inevitably requires a machine of wider size and larger installation area.

Moreover, these belts have to be tolerant of caustic soda, sodium hypochlorite, hot water cleansing, disinfectant, and also have to be capable of easy detachment of the tofu.

In view of the above, the object of the present invention is to provide a continuous curding machine for tofu products, equipped with a belt which is strong, superior in tension strength, resistant to pressing pressure, exerting less load on axis rollers, and is safeguarded against sagging and meandering. In addition, this machine is designed to be capable of manufacturing clean tofu products in that it will not cause a leakage of soymilk and seams and/or wrinkles on the tofu.

The continuous curding machine for tofu products in the present invention is equipped with a belt for transporting soymilk with coagulant as it is being formed into tofu, as well as with a concave member disposed under the belt. The belt features a capability to transport while forming a concave coagulation compartment as it is yielded into concave by being in close contact with the inside form of the concave member. In other words, the belt, which is equipped with the concave member underneath and receives the soymilk with coagulant as it transports the coagulating soymilk, is impermeable and forms a concave coagulation compartment in accordance with the said concave shape of the concave member 10. That is, the belt is impermeable and is an endless type rotating around the axis rollers installed in the vicinity of the said concave member. The belt rotates as it forms the coagulation compartment by being in close contact with the inside of the concave member, and a sluice to stem milk is installed on the belt rotating over the said concave member at its upstream side and downstream side. It is preferred that the upstream sluice on the belt over the concave member is fixedly placed closely inside and at the end of the upstream side of the said concave compartment. It is also preferred that the said endless belt is disposed closely against the bottom of the said concave member. Biasing means such as a spring and air cylinder can also be added to be pressed against the belt, as needed. The downstream sluice on the belt over the said concave member is placed on the belt at the start of production, and then is removed when it reaches the downstream point on the belt. During production, the coagulated and formed tofu itself becomes the downstream sluice. Likewise, at the end of production, the removable sluice, as the second sluice, is placed again when the last batch of the day is being transported toward the downstream, and is removed when the said removable sluice reaches the downstream position along the movement of the belt.

It is preferable that the material for the surface of the belt touching the liquid should be, for example, those that comply with specification tests (or standards) for utensils, containers and packages based on the food hygiene law.

In the present invention, resin coating is required but not necessarily should be accompanied by imperviousness against soymilk or water (cleaning water etc). The coating material for the underside surface and middle layer of the belt does not have to be those for food application, but it is preferable that the underside surface of the belt and the concave member are made of a material that has lubricity so that less friction is caused between them. In addition, the belt can be made of rubber or without wicking. The wicking can be made from metal wire or filamentous material of plastic or metallic fiber, if not from cloth. So the belt with wicking made from such filamentous material, disposed lengthwise along the direction of movement, is preferable because it can easily form concave. Furthermore, material for the "wicking" can be a "canvas" cloth or a layer of more than two such "canvas" cloth; or of polyester or glass fiber, or polyamide, if not "aramid fiber"; or an aramid or steal core as in a steel radial tire; or of porous material as in a punching board. For the material for the belt cover that is impregnated with or attached to the core or canvas cloth, a wide range of so-called "belt for food application," including urethane resin, silicone resin, fluororesin, thermoplastic resin (ex. urethane resin, vinyl chloride resin, polypropylene resin etc) can be used.

According to the present invention, seams on the bean curd can be prevented by creating a concave coagulation compartment that has no juncture between the bottom and sidewalls thereof, and thus has no possibility of leaking of soymilk. Further, since the belt is folded in accordance with the concave member, the meandering of the belt can also be prevented.

The present invention permits the said belt to be an ordinary smooth-surfaced belt for food application, but it is preferable that the belt has a wicking of such materials such as resin coated cloth at least on the side where soymilk is dispensed (wetted surface, outer surface). The belt can be made of rubber, and be dispensed with the wicking. It is preferable that the core gives tension to the belt while allowing it to bend in concave. The core can be made from reticular material or filamentous material disposed lengthwise (in the direction of movement), if not cloth. The material for such core is preferably natural fiber such as cotton or hemp, or various type of synthetic fiber, thus especially preferable is such material with rigidity of warp thread so as to avoid slackness, but thin metallic fiber also suffice. More preferably, the said concave member is a fixed or moving member made of metal (stainless steel, titanium, aluminum and so forth) or resin. The said cloth, in particular, is preferably of impermeable fluoro-resin coated aramid fiber. The use of wicking made of aramid fiber for the belt enhances strength with less chance of slackness, and raises thermal conductivity because it allows the belt to be thinner, and shortens coagulation time when high-temperature coagulation is employed, and further demonstrates improved durability against friction with the concave member. Conversely, with enhanced heat transfer coefficient from the addition of heating and heat-retention mechanism, it becomes possible to manufacture water-retentive and spongy high-quality tofu even at a lower coagulation temperature than by conventional methods. In addition, as it will be explained later, its elasticity permits the belt to be easily flattened (when it is returned to be a flat belt) when returning from the concave to the flat condition, or after being folded. The impermeable fluoro-resin coated aramid fiber cloth can demonstrate a variety of such merits as described above even if the concave member is made of steel or metal.

According to the present invention, it is preferable that the said cloth is made thinner at both left and right corners of the concave formed by the belt, because it then allows easier folding into concave.

In other embodiment, a belt that has been molded with left and right side folded so as to make it pliable to folding can be used so that it does not have to be made thinner at both corners. In such case, the original cross-section shape is concave, and the belt is spread and flattened when rotating toward the axis rollers. Also permissible is an embodiment in which the belt exploits thinnish cloth so that it excels in pliability in crosswise direction and has no need to be made thinner or pliable to folding. In this case, the folding can be configured at any point crosswise, guided by a concave supporting board or any such guide.

In this invention, the said belt is flattened when rotating around the axis rollers installed in the vicinity. So it is preferable that the belt forming the said concave becomes flattened when rotating around the axis rollers. The belt should not necessarily be an endless type, but can also be the one which rotates only in one direction during production.

If the belt is rotated around the axis rollers, with its left and right ends folded, the axis rollers have to be made larger due to the large load exerted thereon. However, according to the present invention, the radius of the axis rollers can be reduced because the belt is flatted when it rotates around the axis rollers (a large-radius roller, such as a metal roller, becomes unnecessary, and moreover, load from tension and gravity deriving from a metal roller can be reduced). It also has a benefit of smooth transfer of products, because both the outer circumference of the belt as well as the distance between the said belt and another belt for later process (cutting and partitioning) can be reduced.

In the present invention, it is preferable that the radius of the said axis rollers are formed in a tapered shape or at a smaller radius at both ends than at the center in order that the left and right ends of the belt rotate around such tapered or smaller-radius portion of the axis rollers.

According to the present invention, difference in the length of the circumference can be adjusted by making both ends of the axis rollers tapered or in small-radius. In other words, a difference in circumference between the bottom (the horizontal part) and both ends (where they stand vertically) arises from the action of the belt which repetitively stands and flattens. But this difference can be absorbed by making the axis rollers tapered where the belt rotates flattened. Also, the belt, in the present invention, is driven to have both sides upright from the flat condition, thereby causing tension lengthwise and thus serving as an effective measure against slack, while preventing meandering of the belt.

Further, in the present invention, a sluice to hold back soymilk is installed on the upper stream side of the belt that is placed on the said concave member. Such a sluice is preferably a fixed plate installed on the said endless belt so as to press the latter to be in close contact with the said concave member underneath. The said sluice placed at the upstream side of the endless belt so as to press the latter to be in with its left and right ends folded, close contact with the said concave member underneath is preferably square-shaped to effectively perform the given function.

According to the present invention, because the above sluice is square-shaped corresponding to the shape of the upper surface of the said concave member at the upstream position, it becomes possible to align the endless belt, conveyed over the said concave member, at the crucial position that corresponds to the threshold of the said concave member, and whereby serving as a basing point for the prevention of meandering as well as providing function effect in maximizing the utility of the surface area of the said concave member.

According to the present invention of the continuous curding machine for tofu products, it is possible to reduce device cost because of simple mechanism. Because, in the present invention, since the belt with resin coating is formed in concave as a coagulation compartment for coagulating soymilk into tofu, with the belt flattened when rotating around the axis rollers in the vicinity, it becomes unnecessary to employ a conventional and complicated mechanism that has belts installed also at both sides of the main belt and consequently has a problem of leakage of soymilk from the joining section. It also has an advantage of being hygienic because the backside of the belt and the surroundings do not become messy with soymilk leaked from the joining part. Since the surface of the cloth belt is at least treated with resin coating, a seam at the joint of the bottom and both ends of the main belt no longer occurs, and consequently, the tofu block can be cleanly shaped.

Moreover, with the belt being flattened around the axis rollers in the vicinity, the radius of the axis rollers can be formed thinner or smaller, which enables easy transfer of the tofu from the forming machine to a cutting conveyor or autopackaging machine used in later process flow. In particular, this method has huge advantage in space saving and reduction of load over the axis rollers, because it enables the use of an axis rollers with smaller and thinner radius even in a machine with larger length and/or width. Besides, by making the left and right sidewalls of the concave member higher where the belt is adjusted to such configuration, this method enables the formation of the tofu block whose side can be higher (deeper), thereby enabling cutdown of the radius of the axis rollers even with a coagulation compartment adjusted to the longer side of the tofu block ("tatedori") for silken tofu products. Consequently, this method provides a structure enabling easy transfer of the tofu to the next process because it can shorten the length and/or width of the machine and is economical in, terms of installation area.

BRIEF DESCRIPTION OF THE DRAWINGS

FIG. 5 is a sectional view showing a belt according to one embodiment of the present invention.

FIG. 9 is a sectional view of the transfer from the conventional belt illustrated in FIG. 7 to another belt.

DETAILED DESCRIPTION OF THE PREFERRED EMBODIMENTS

Next, the description will be made concerning concrete embodiments according to the present invention by referring to the figures.

Figure 1:
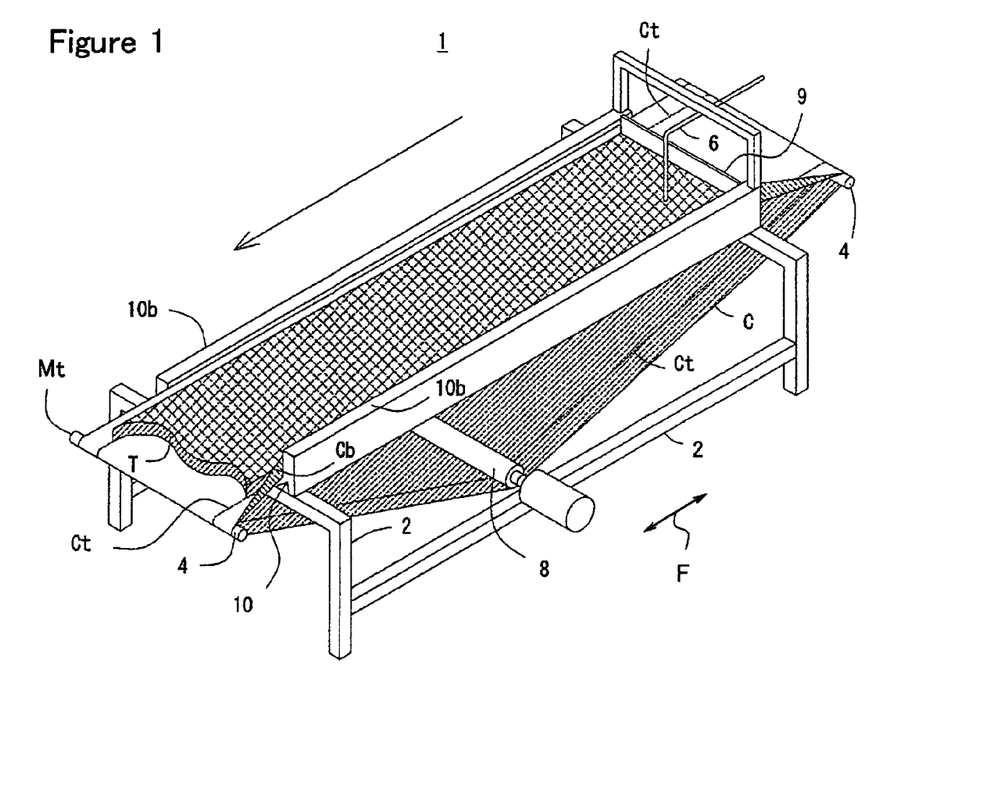
FIG. 1 is a perspective view showing a continuous curding machine for tofu products according to one embodiment of the present invention.
Figure 4:
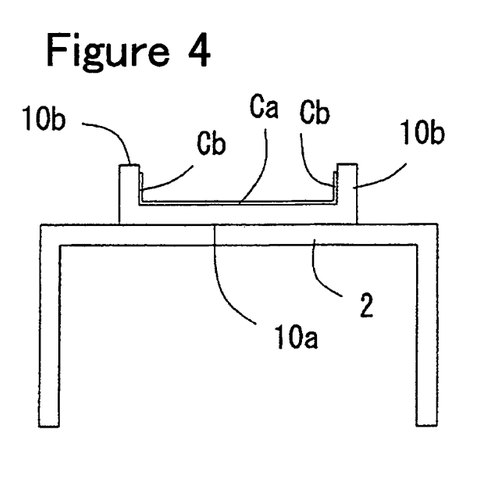
FIG. 4 is a sectional view showing one embodiment of the present invention.
Figure 12:
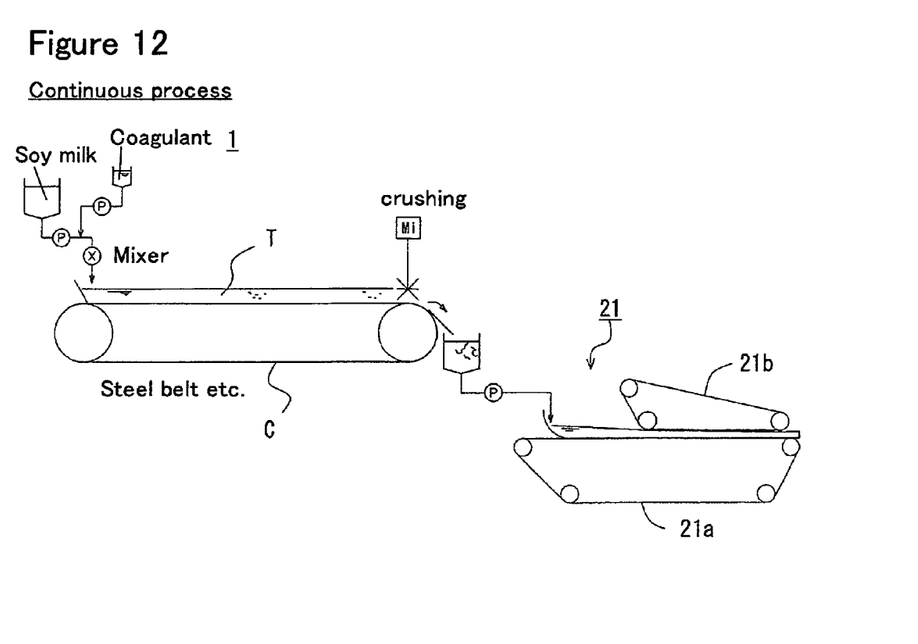
FIG. 12 is a sectional view illustrating a machine according to one embodiment of the present invention and a forming machine used in later process flow.
Figure 13:
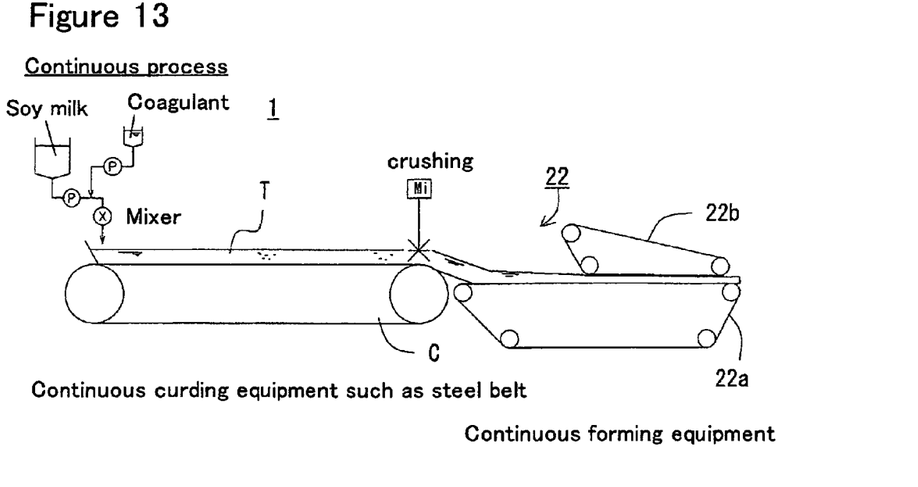
FIG. 13 is a sectional view illustrating a machine according to one embodiment of the present invention and a forming machine used in later process flow.

Embodiment as shown in FIGS. 1 and 4 is a continuous curding machine for tofu products 1 equipped with a concave member 10 disposed over a base 2 and a belt C that moves along the length of the base 2. Incidentally, the tofu coagulated in the form of a sheet (or a belt) T by the continuous curding machine 1 for tofu products is not crushed in the case of soft tofu or silken tofu, but is crushed in the case of firm tofu or tofu slices for fried products by means of a crushing instrument Mi, as shown in FIGS. 12 and 13, and is then transferred to the next forming machine 21, 22, or otherwise to a cutting and partitioning machine or packaging machine not shown herein.

The base 2 has legs at each corner and is made of iron steel or stainless steel. Over the base 2 is disposed the concave member 10, and at the forefront (the downstream side) is disposed a driving axis roller 4 (on the downstream side) while at the rear is disposed a following axis roller 4 (on the upstream side), and further, underneath the base 2 around the center is disposed a tension roller 8. It is preferable that the belt C is an endless type which rotates around the said pair of axis rollers 4 and 4A and is given tension by the tension roller 8. It is also possible to employ an embodiment in which a belt that is rolled up at the upstream side is reeled in at the downstream side, though this type is not shown in a figure here. Also, though also not shown here in a figure, the base 2 is equipped with a washing tank to cleanse the belt C. The warmed soymilk with coagulant is supplied from a feeding pipe 6 disposed at the upstream side over the belt C, and having formed the concave compartment Ca, Cb, is coagulated in the process it is transported toward the downstream where the belt becomes flattened. In other words, the soymilk becomes tofu T in the form of a sheet (or a belt). A drive unit for the belt does not have to be placed at the axis roller 4 but can be disposed underneath the base 2.

The concave member 10 supports the belt C from under as well as from both sides while it is pressed against its concave shape, and is shown to be concave in a sectional view. The concave member in the said embodiment is fixed and not movable. The material for the fixed concave member 10 can be either iron steel, or stainless steel, or other metal such as titanium, or resin, or a plate made of any of these. Also, the concave member 10 can be made from a metal mesh or a punching with numerous small bores, fine pores or small channels, or can be made with the said plates, made of such materials as metal, disposed at given intervals. In other words, it can be made permeable. In this way, enhanced drainage performance can be obtained between the belt and the concave member, thus enabling easier cleaning.

The concave member 10 can be of a movable type made of, for example, caterpillar as in a plate conveyor, metal mesh belt, or punching belt with numerous small bore, fine pores or small channels (that moves toward the direction F in FIG. 1). Such a removable type can prove to be effective where friction is large due to the weight of soymilk or Tofu T. It is also possible to enhance heat-retention by making the sidewalls or the supporting bottom (the surface against which the belt 3 slides) of the concave member 10 in double jacket structure. Heat-retention by a double jacket structure with dead-air space can also suffice. The quality of tofu can be improved by heating and heat-retention via the coagulation compartment 10a or 10b, and the belt Ca or Cb. In that case, it is preferable that the said belt C is thin (0.5~5 mm) so that it is capable of effective heat transfer. Further, it is possible to supply hot water or steam inside the double jacket of the concave member 10, so as to provide heating or heat-retention at a given temperature and/or sterilize the back of the belt C. There is also an option of installing a cover or vent above, and supplying steam in the space over the Tofu T for heating or heat-retention.

Figure 2A:
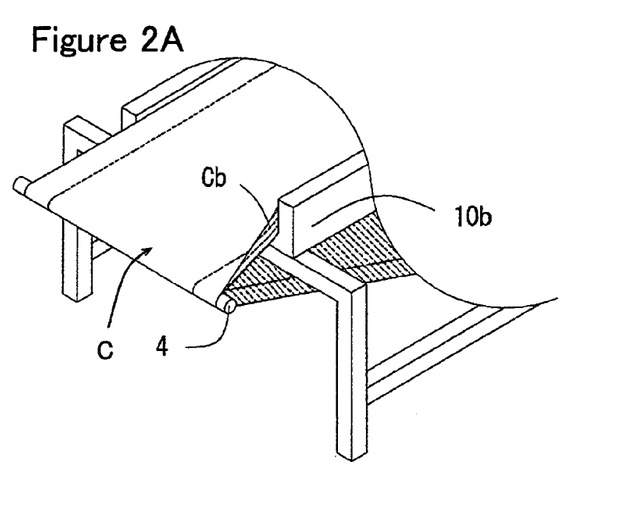
FIG. 2A is a perspective view showing a forefront end (the downstream side) of the belt toward the direction of movement according to one embodiment of the present invention.
Figure 2B:
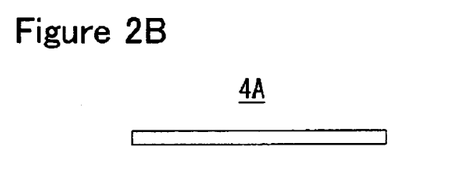
FIG. 2B is a plan view illustrating an axis roller used therein.
Figure 3A:
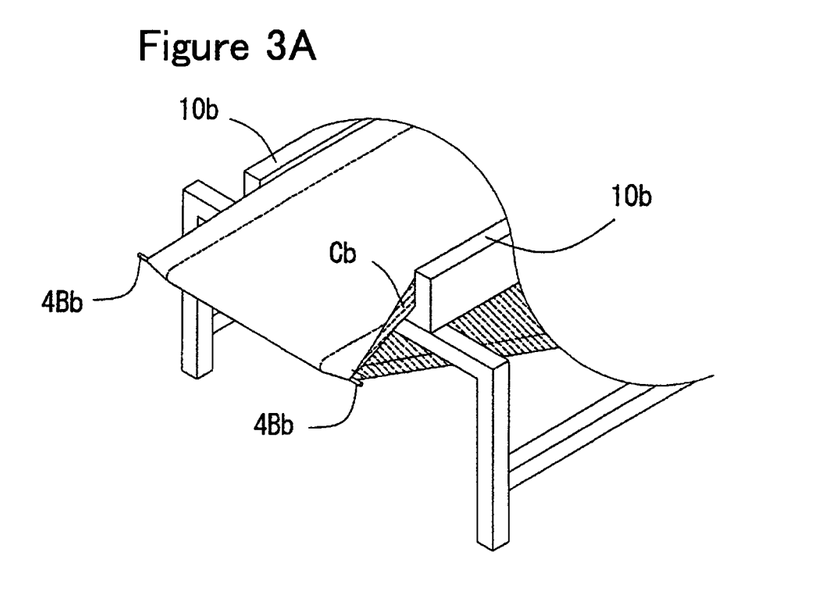
FIG. 3A is a perspective view showing a rear end (the downstream side) of the belt toward the direction of movement according to one embodiment of the present invention.
Figure 3B:
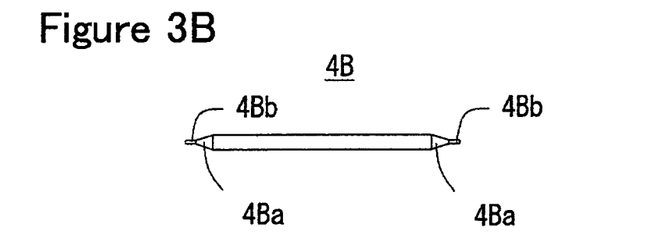
FIG. 3B, FIG. 3C are plan views illustrating axis rollers used therein.
Figure 3C:
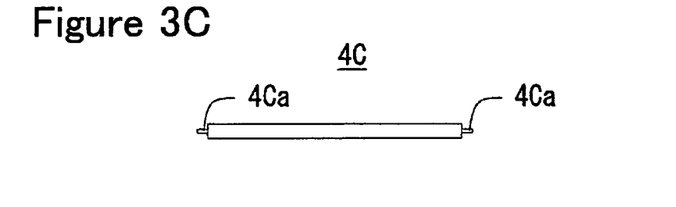

The axis roller 4 at the upstream side is a small roller (FIG. 2A, FIG. 2B). It is also possible to use a similar small roller for the axis roller 4 (the driving axis, for sample) at the downstream side, but in the embodiment described herein, the downstream axis roller 4 is tapered at both left and right side, as in 4Ba (FIG. 3A, FIG. 3B), for the purpose of easing irregularity in tension in the said belt C as well as reducing difference between the circumference of the belt C's bottom and that of the belt's both sides. In other words, both left and right sides of the belt C stand upright when rotating around the concave member 10 and become flattened in the vicinity repetitively, resulting in a difference between the circumference around the bottom (the horizontal plane) 10a and that around both sides standing upright 10b. By means of making the left and right ends 4Bb of the axis roller 4, whose width corresponds to the width of the circumference 10b, it becomes possible to absorb the difference in the circumference. A roller with a smaller radius for both left and right ends than at the center 4Ca (an axis roller employing various radius at its different part) can also be used for the axis roller 4 (FIG. 3C). By using such axis rollers as described above (4A, 4B, 4C) for the belt C, driven with its both sides standing upright at the position of the concave member 10, it becomes possible to equalize tension that is exerted lengthwise (in the direction of movement) on the belt C. On the other hand, the upstream axis roller 4, where soymilk is supplied, is formed in the shape of a thin and round tube (FIG. 1), but it is also possible to use a tapered axis roller 4Ba, as in the downstream axis roller 4, so as to use it to ease the difference between the circumference at the bottom and that at the upright sides of the belt C.

Figure 6A:
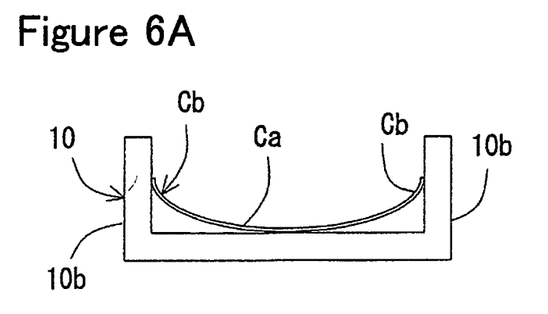
FIG. 6A, FIG. 6 are sectional views each of which illustrates an example of one embodiment of the present invention.
Figure 6B:
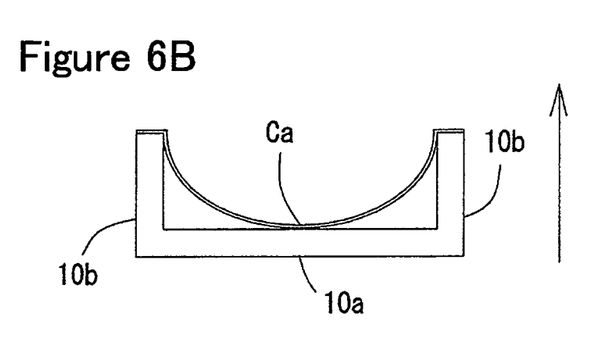

The belt C is folded into concave in accordance with the concave member 10 at the position of the concave member 10, where the bottom plane Ca, which is concave-shaped when viewed in section, and vertically pulled parts at both sides Cb, Cb, are formed. That is, the outer bottom surface Ca contacts the bottom surface 10a of the concave member 10, while the vertically pulled parts Cb, Cb contact the sidewall sections of the concave member 10b. Here, as shown in FIGS. 6A and 6B, the belt C can be placed in arc with respect to the concave member 10. For the production of tofu products involving crushing, such as finished slices of tofu to be made into firm tofu, deep-fried tofu, thick-fried tofu, thin-fried tofu (tofu pouches), fried-tofu with vegetables, there is no need to make the wicking (cloth) 3 or the resin coating 7 of the belt partially thinner lengthwise (in the direction of movement), or to have a crease Ct, thereby gaining an advantage in retention of strength. Also, when the belt C, whose bend is large or which has no crease, is disposed against the left and right inner sidewalls 10b of the concave member 10, it is possible to add years to life of the belt. Moreover, with less amount of angular pieces of bean curd, the tofu becomes less prone to be chipped and have less curd residues, and with less uneven distribution of heat when heated by the heating unit, it results in more uniformly high quality tofu.

In this way, the endless belt C is not connected to the concave member 10, and flattens when it rotates around at the upstream axis roller 4, while it is folded into concave at the position of the concave member 10, and then is again flattened at the downstream axis roller 4. The belt C is reeled out longer than the length of the concave member 10 lengthwise in the vicinity, and then is reeled in by the axis rollers 4.

The belt C is preferably made from resin coated cloth material. Any type of thin, flexible and strong belt for ordinary food application will suffice, and this embodiment in particular takes it as given that such belt is impermeable, and is made from aramid fiber cloth 3 with fluoro-resin coating 7 (FIG. 2B) so as to lessen friction resistance with respect to the concave member 10 and also lessen slackening. The belt C can be of back-front two-layered structure, or of multilayered structure by having another belt of different material gummed to it. That is, the cloth 3 as well as the resin coating 7 can be multilayered. The belt can also be made of Teflon (trademark) resin that has strings (aramid fiber or metal wire) lengthwise only, instead of cloth wicking.

Also, a belt for meandering prevention, for example, a convex belt can be adhered to the back of the belt. Although not illustrated here, in order to, avoid slipping from a driving shaft, the backside of the belt can have concavity and convexity crosswise so as to have them engaged with the concavity and convexity of the driving shaft. The axis roller is preferably made of metal or resin/rubber with heightened friction with respect to the conveyer belt. A driving unit can also be installed on the returning part (between the axis roller 4 and the axis roller 4) under the belt C.

Especially, it is preferable that the folded parts at the left and right ends of the belt C have runnels or slits lengthwise, or should be made thinner in order that they are pliable. At the bottom and at both ends is equipped a fixed concave member or a supporting compartment formed in concave when viewed in section (made of resin, metal or stainless steel; for example, a boat-shaped coagulation compartment in concave when viewed in section; or a type employing guide rail bar etc.), or a movable concave member (for example, a caterpillar that moves in conjunction with the belt). For the cloth 3 constituting the wicking and for the fiber used for the string-like or mesh-like member, it is preferable to use, for example, so-called "super fiber" or "engineering fiber" that have recently been developed, such as para-aramid fiber (Teijin Techno Products's "Technora" and "Twara," Du Pont-Toray's "Kevlar" etc.) and meta-aramid fiber (Teijin Techno Products's "Teijinconex" etc.). Other possible choices other than aramid-fiber include ultra-high molecular weight polyethylene fiber (Toyobo's "Dyneema" and "Tsunooga" etc.), polyimide fiber (Toyobo's "P84"), polyarylate fiber (Kuraray's "Vectran," Honeywell's "Spectra" etc), poly (p-phenylene 2,6-benzobisoxazole) (PBO) fiber (Toyobo's "Zylon" etc.), poly (p-phenylene sulfide) fiber (PPS) fiber (Toyobo's "Procon", Toray's "Torcon"), fluorine fiber (Toray's "Toyoflon" and "Teflon"), high-strength polyvinyl alcohol (PVA) fiber (Kuraray's "Kuralon K-11"), polyketone fiber (Asahi Kasei's "Cyberlon"). The material for strings to be used can be combination of any of those above, or a cloth that is fabricated with any of these above. Or, it can be a cloth made of conventional plastic cloth, or natural fiber such as cotton, hemp or silk, even though these can be less strong. In every case, it is preferable to make the strings or cloth with thin monofilament (less than or equal to 0.5 mm) or multifilament/spinning obtained by twisting the former so that the strings or cloth have high tension and fatigue endurance (resistance to fatigue by flexion). The cloth can be woven in any way as long as it at least produces thinness and resistance to slacking lengthwise, such as plain fabric and twill. A cloth that tends to lengthen may have more friction due to the weight of the Tofu T, resulting in irregular deflection of the cloth, and thus is not desirable. A high-strength nonwoven type of cloth can also be used. A cloth made of fiber with monofilament of more than or equal to 0.5 mm has large bend R, forming the tofu with rounded corners, and thus is not desirable.

As for the resin coating 7, it is preferable that it has small friction with the concave member 10 on the underside, and as for the upper surface, the resin coating should comply with the standard prescribed by the food hygiene law (according to the regulation in each country), and preferably has easy detachability with respect to the tofu, and is less prone to have flaking and crack at the bend (i.e. resistance to fatigue by flexion). If too thick, the resin coating 7 becomes less desirable because of less flexibility and larger bend R. Especially when used for the production of silken tofu, the larger R with more than or equal to 10 mm has a possibility of producing poor-looking tofu, with the tofu at both ends having weight shortage. The R, adjacent to the corners of the tofu, of less than or equal to 5 mm virtually causes no concern. At least the upper surface where soymilk is supplied should have resin coating 7, but it is preferable that the whole thing including the underside is resin coated. It is preferably impermeable as a whole by giving resin coating all over. Especially, in the case that the said concave member 10 has a fixed and impermeable structure and is made of metal, stainless steel or other such material, the aramid fiber 3 acquires, if given fluorine coating 7, less flaking of coating by repetitive flexion (high resistance to fatigue by flexion), smoother surface even under lord by the weight of tofu, more resilience and less lengthening and warping, more tension strength even with the thinness of around 0.5~5 mm, water-shedding quality with more detachability of tofu, sanitary and resistant to contamination, heat (high temperature)-safe (when the said heating instrument is implemented for the coagulation compartment), and is superior in chemical proof.

Figure 5A:
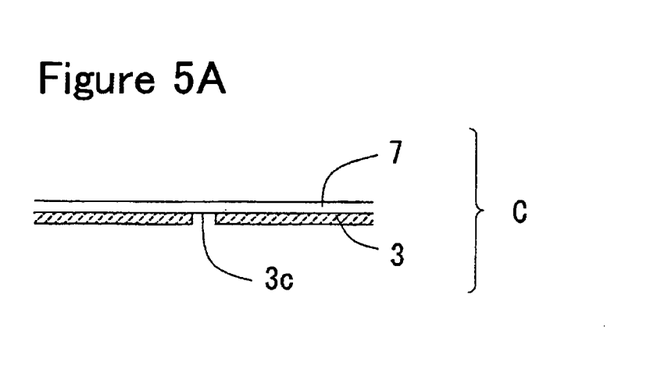
FIG. 5A is a sectional view of the belt when flattened.
Figure 5B:
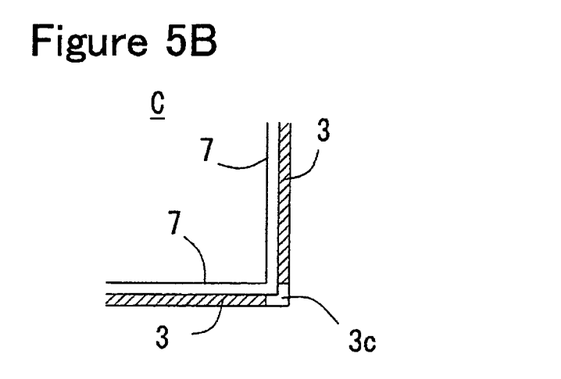
FIG. 5B, FIG. 5C are sectional views illustrating the belt folded in concave.
Figure 5C:
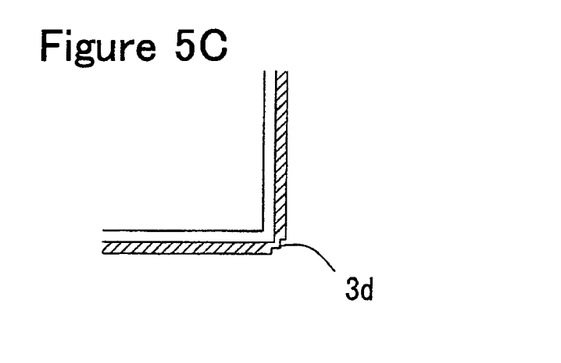

In the belt C, there is the part 3d where the cloth 3 is made thinner in order that the belt can be pliable to folding into concave at this position (FIG. 5C). Or otherwise, though not shown herein, the layer of the resin coating 7 can be thinner. Or, a line Ct for folding, such as a line of perforation, can also be given. Further, as shown in FIGS. 5A and 5B), only the resin coating 7 can be retained without using the cloth 3 (FIG. 5A and FIG. 5B) at both left and right outside corners of the bottom of the concave. Also, though not shown herein, the belt can be pressed in concave in advance, or given prior treatment so as to make it pliable in concave. Further, though not shown here, since the joint seams of the endless belt can be thick or hardened where a crease can be made, due to stitching, bonding or welding in addition to super, such stitching or bonding or welding can be omitted at the crease. Instead, as long as the crease is concerned, at least leakage of liquid should be avoided, for example, by resin welding without joint or welding of a thin resin sheet to the wetted surface, though it may not enhance strength.

Figure 2C:
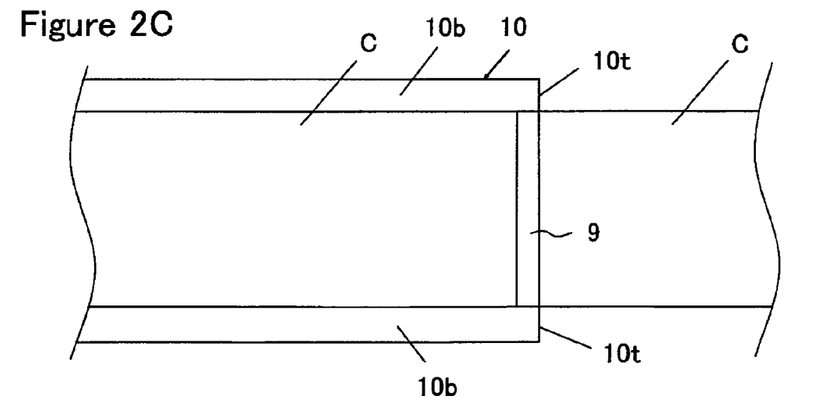
FIG. 2C is a plan view showing a sheeting, installed inside of and toward the upstream side of the said concave member, which is a square-shaped sluice pressing the belt to be in close contact with the said concave member underneath.
Figure 10:
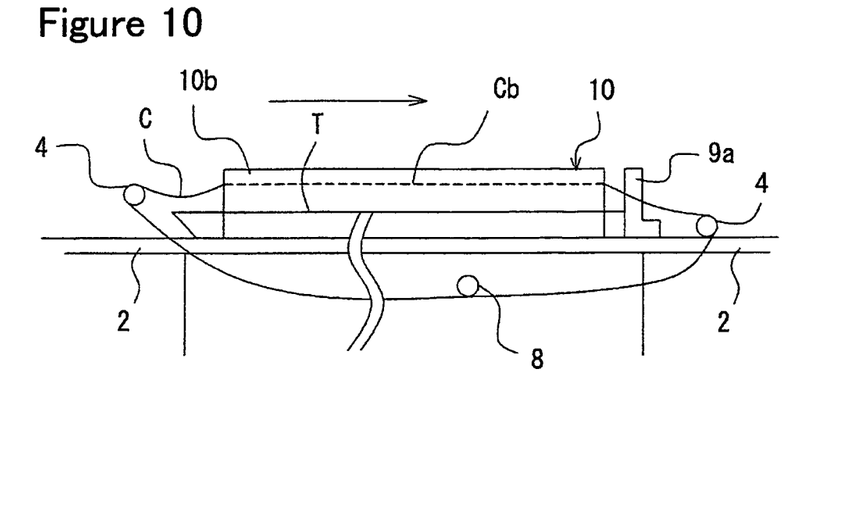
FIG. 10 is a sectional views showing an example of one embodiment of the present invention.

The upstream sluice 9 is installed on the upstream side of the belt C (FIG. 1) The upstream sluice 9 is a fixed plate that is closely placed against the belt C so as to permit no leakage and shapes the belt C in concave by pressing the latter against the inner wall of the concave member 10. Complete avoidance of leakage can also be secured by making the height of the belt shaft higher than the depth of the coagulated soymilk. In that case, the soymilk with coagulant can be supplied smoothly and evenly over the belt C by taking advantage of the slope formed by the belt C. To the extent to which coagulation does not fully take place, the turned-back corners at the both ends of the belt do not have to be angular and can have roundness R as in FIG. 6. A holddown roll or leading guide can be added as needed. Also, as the belt is gradually outspreaded inside the supporting concave member 10 by the weight of the coagulating soymilk supplied therein, its left and right ends at the bottom are folded without being too rounded. In other words, the position of the axis roller on the rear side (the upstream side) in this embodiment has more or less the same height as the bottom 10a of the concave member 10, but as shown in FIG. 10, it becomes possible to have soymilk formed and coagulated without using the sluice 9 by placing the axis roller 4 at a higher position than the bottom 10a of the concave member 10 (that is, by placing the upstream axis roller higher than the concave member 10 over which the load of the soymilk is exerted.) It is preferable to install a similarly sloping supporting member under the belt C that forms slope. The said upstream sluice is, as shown in FIG. 2C, a square-shaped plate that presses down the belt against the inside wall of the upstream end 10t of the said concave member 10. Such configuration enables alignment at the crucial point serving as the base point of pressing the endless belt, transported by the said concave member 10 whereby achieving effective prevention of meandering as well as providing function effect in maximizing the utility of the surface area of the said concave member 10. Also, in comparison with Patent Document 2, it has an advantage in dispensing with a hard belt (a metal belt, for example) because it can be supported by a supporting member and is disposed inside the said concave member. Consequently, it becomes possible to achieve clean coagulation of soymilk (clean outer circumference). In other words, a sluice that is simply installed on the belt can let soymilk leaked from under because of the weight of soymilk, but the installation of a sluice designed to stem soymilk on the belt disposed inside the said concave member causes no such concerns. Further, an endless belt simply disposed on a concave member may not achieve close alignment with the inside of the said concave member (the close alignment with the inside of the said concave member may not be achieved due to the height of the position where the axis roller is placed, or to the flattening of the belt when reeled in), but since the said sluice is disposed in order that it presses down the said endless belt against the inside bottom of the said concave member (see FIG. 1), it achieves function effect of disposing the endless belt aligned closely along the inside of the said belt (simultaneously serving as a sluice and keeping the belt in a stable position). As a result, clean coagulation of soymilk (clean outer circumference) is achieved.

Down from the upstream slice is the downstream side where, when soymilk is supplied, the weight of the soymilk causes the endless belt to contact the bottom of the said concave member, that is, when the soymilk is supplied, it becomes coagulated on the endless belt because of its load exerted evenly thereon as if a fixed anchor. This effect can be achieved even more in a larger equipment or in "tatedori" (take the longest side of a cake of tofu for the depth of the compartment), in other words, more such effect can be achieved when the soymilk is transported while it is streaming inside a deeper coagulation compartment formed by the endless belt.

On the other hand, as shown in FIG. 10, a removable sluice is used as the downstream sluice 9a only at the start of production, and then after the tofu sheet (belt) T is formed, the sluice is removed because the tofu sheet itself can serve as a sluice. Also, though not illustrated herein, the removable sluice is installed at the rear end of the tofu sheet T (as the second upstream sluice) at the end of production. Incidentally, these removable downstream sluice and removable second upstream sluice have the same effect as the said upstream sluice of pressing the belt against the inside of the said concave member along the inner wall of the upstream end 10t of the said concave member 10.

Next, the coagulation and formation of tofu by using the continuous curding machine for tofu products 1 will be explained. The following explanation takes production of silken tofu as an example, but also applicable is the production of other tofu products such as finished slices before they are made into deep-fried tofu, thick-fried tofu, thin-fried tofu (tofu pouches), fried-tofu with vegetables, as well as firm tofu, baked tofu, softer firm tofu, and frozen tofu products, and retort tofu products.

As shown in FIG. 1, the belt C is activated by powering the axis roller 4 by the driving means Mt. The belt C has thinner parts 3c or 3d or a crease Ct on the belt layer member 3, and its left and right ends are folded along the crease Ct to form concave (the coagulation compartment Ca, Cb), but becomes flattened again at the position of the axis roller 4 at the rear (the upstream side) and the axis roller 4 at the forefront (the downstream side), thus enabling conveyance as a whole (FIG. 1). The tension of the belt C is adjusted by the tension roller 8, and can also be adjusted by the tapered parts of 4Bb of the far left end and far right end of the axis rollers 4Ca as well as the small-radius parts of the same (FIG. 3). Since the belt has the thinner parts 3c or 3d or the crease Ct, such parts are aligned with the tapered parts of 4Bb of the far left end and far right end of the axis rollers 4.

Then, when the soymilk with coagulant such as bittern (warmed soymilk with coagulant with milk solid density of 3~15% wt, at the temperature of 40~99° C. or more, or preferably 60~95° C. normally) is supplied into the concave formed by the belt C (the coagulation compartment Ca, Cb) from the supplying means 6, it is then transported toward the downstream on the belt while it coagulates. In this way, the tofu (in the form of a sheet or belt) T is continuously turned out, where the soymilk coagulates as it is transported on the belt. Although not illustrated herein, the sheet (belt) of tofu that is coagulated and formed continuously by the continuous curding machine 21,22 is cut into blocks crosswise as it is transported, and then these blocks are cut lengthwise into cakes of tofu by a cutting-partitioning machine equipped with movable blades (whose interval is adjustable crosswise).

In the case of coagulation using the concave belt C, as shown in FIG. 6, an arc is formed inside the concave member 10, resulting in the tofu with more or less rounded corners at left and right. Incidentally, in the case of the production of regular tofu whose process involves crushing of the total amount, there is no problem in having a large R. The R should be as small as possible for the production of silken tofu, and in some cases, rounded part is cut off even though it lowers yield rate.

Figure 11A:
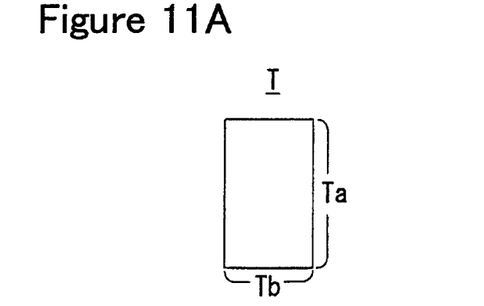
FIG. 11 is a plan view of the tofu to illustrate formation of the tofu according to its longer side ("tatedori") and its shorter side ("hiradori").
Figure 11B:
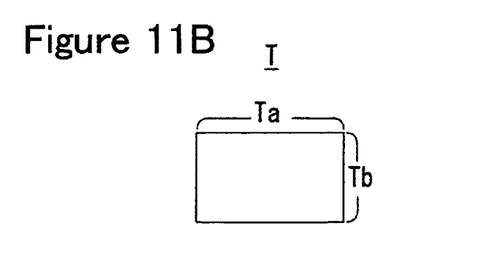

In this embodiment, it is possible to take the depth of supplied soymilk (the tofu) is to be the longest side of silken tofu products ("tatedori"), as against the conventional "hiradori" in which the depth of supplied soymilk is taken to be the thickness of silken tofu products. As shown in FIGS. 11A and 11B, it is possible to perform "tatedori" in which one of the two sides of cuboid silken tofu other than its thickness, for example the length of its longest side Ta, is taken from the depth of the supplied soymilk, as against "hiradori" where the thickness Tb of the silken tofu T is taken from the depth of the supplied soymilk. A conventional belt C, such as described in Patent Document 7, requires large-radius axis rollers, because it is made of metal and also because there is a limit to have excess part to manage elongation of rubber-made sidewalls 11b at left and right, which are installed to cover the entire length of the belt C and get elongated as they rotate around the axis rollers, and for this reason small-radius axis rollers have disadvantage. In this way, conventional methods can secure only the "hiradori" depth, because they require the height of the left and right sidewalls 11b to be lowered.

Figure 7A:
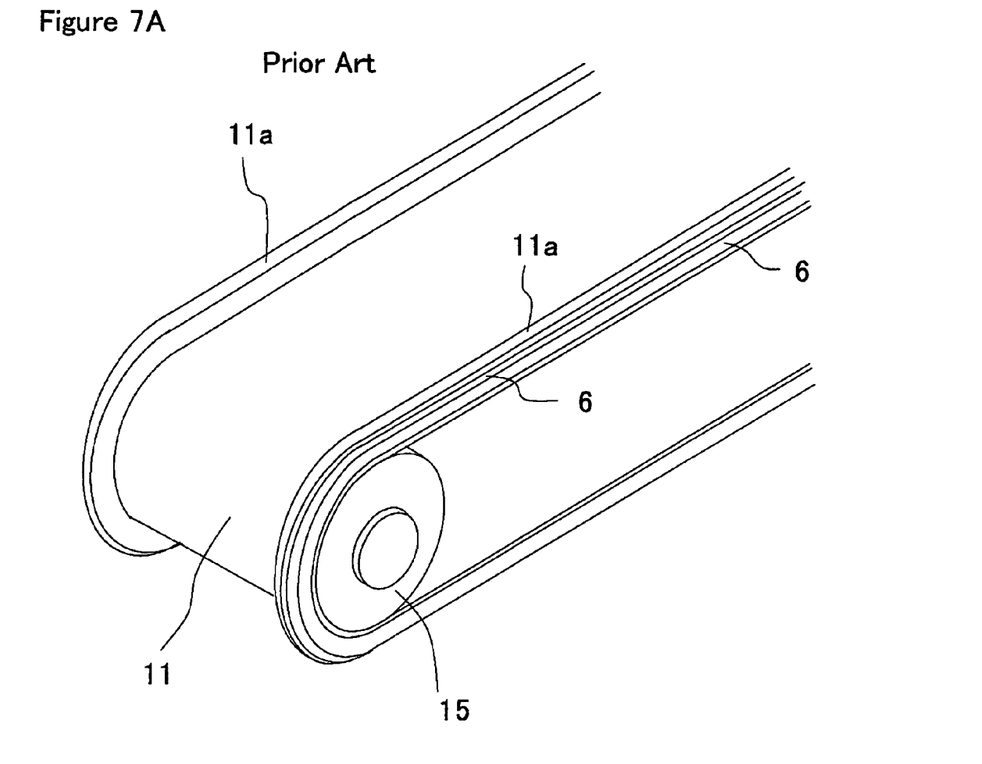
FIG. 7A, FIG. 7B are a perspective view and a sectional view illustrating a conventional concave belt.
Figure 7B:
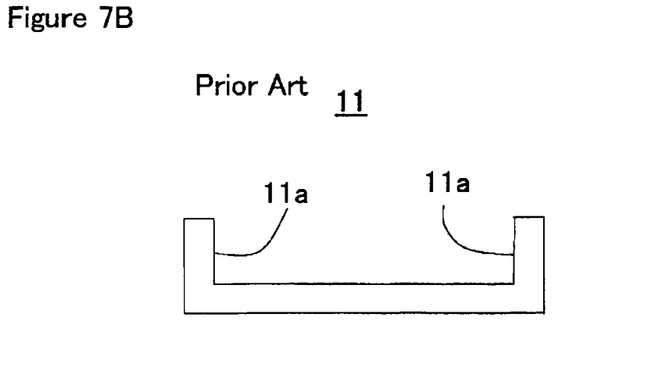
Figure 8:
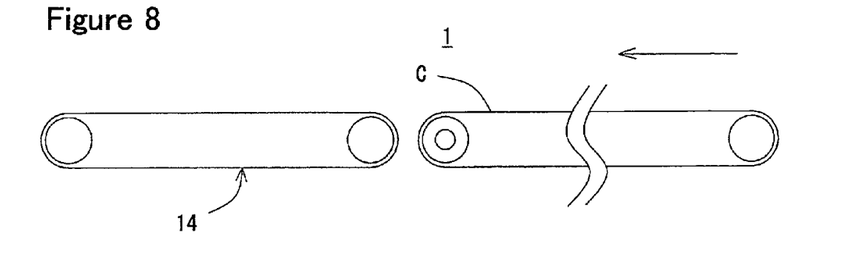
FIG. 8 is a sectional view illustrating the transfer from the belt according to one embodiment of the present invention to another belt.
Figure 9A:
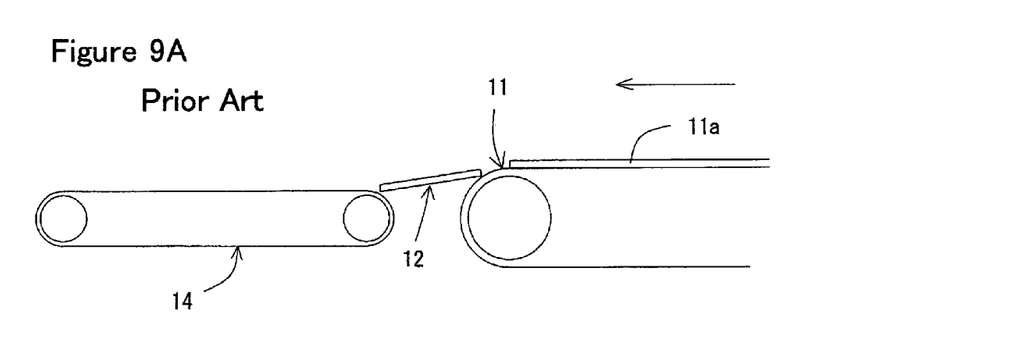
FIG. 9A shows a transfer board.
Figure 9B:
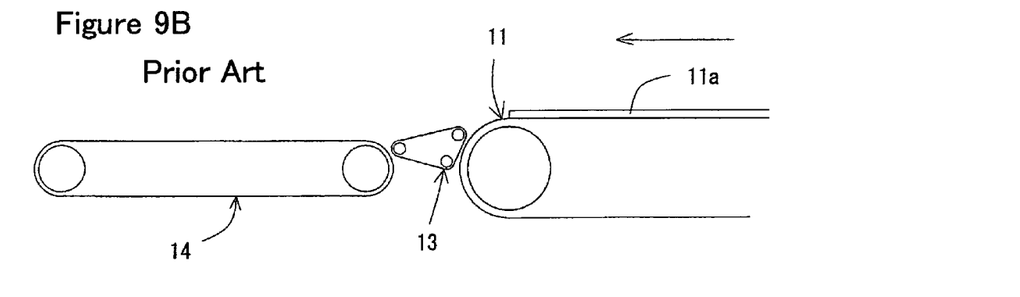
FIG. 9B illustrates the transfer conveyor.

The tofu that has been cut into a given size is then discharged from the discharging side to be transferred to the packaging process. In conventional methods employing large-radius axis rollers, a long transfer board (see FIG. 9) or a transfer belt 13 (see FIG. 9C) may be used for the bean curd discharged from the discharging side. However, since this embodiment can utilize small-radius axis rollers, it becomes possible to dispense with the transfer belt 13 or shorten the transfer board 12, thus enabling smooth transfer of the tofu to the transfer belt 14 for the next process. Also, in a conventional concave belt described in Patent Document 2, as shown in FIGS. 7A and 7B, the height of the left and right sidewalls 11a cannot be heightened, for higher sidewalls cause larger load on the axis rollers and also creates difficulty in rotating (rotation drive) (FIG. 9B), for the reason that the radius of the axis rollers 15 have to be large. By contrast, according to this embodiment, heightening the left and right sidewalls 10b of the concave member 10 and thus making the coagulation compartment Ca, Cb of the belt C deeper (its walls higher) create no problems for reasons that the belt can be flattened at the position of the axis rollers 4, 4 and that the radius of the axis rollers 4, 4 can be made smaller. In other words, to the extent that the radius of the axis rollers 4, 4 can be made smaller, it is possible to have higher (deeper) sidewalls of the coagulation compartment Ca, Cb of the belt C.

The production of regular tofu may differ in process from that of silken tofu in that more coagulant can be added to soymilk or soymilk can be diluted. The making of firm tofu can be explained here, as shown in FIG. 12 and FIG. 13, following the similar process as silken tofu. The tofu coagulated similarly to silken tofu is then crushed, equalized, transported onto the lower cloth of a continuous forming machine 21a, 22a, and made into firm tofu by being pressed by the upper cloth 21b, 22b. Since the sheet of tofu (the block of silken tofu), as it is, cannot be drained enough by pressing, as in regular tofu, the sheet of tofu needs to be crushed by a mixer Mi (a crushing machine). First, soymilk is coagulated and formed into a sheet by the continuous curding machine for tofu products 1 according to this embodiment, and then the tofu block T is crushed by the mixer Mi at the downstream of the machine 1, and finally it is pressed and formed by being pressured in-between the permeable cloth at the continuous forming machine 21,22. Incidentally, when making silken tofu, the coagulated tofu is not crushed and squeezed as described above, before transported (matured) on the lower cloth 21a, 22a at the continuous forming machine 21, 22. Soft tofu can made only by "hiradori," where the tofu is transported on the lower cloth 21a, 22a at the forming machine 21, 22 in a similar manner to the making of silken tofu, and is lightly pressed to create grain on the upper and bottom surface of the tofu.

As described above, the process involving the continuous curding machine for tofu products 1 is followed by the forming process involving the continuous forming machine 21, 22 which may employ forming by means of boxes or batch process.

1. A continuous curding machine for tofu products
2. A base
3. Cloth (a wicking)
4. 4A, 4B, 4C, axis rollers
4Bb left and right ends of the axis rollers (tapered parts)
4Ca both ends of the axis rollers with different radius (smaller-radius)
7. Resin coating
10 Concave member, 10a bottom, 10b left and right sidewalls
21, 22 Continuous forming machine
C A conveyor belt, Ca bottom, Cb left and right sidewalls (rising part)
T Tofu (a tofu block)

What is claimed is:

1. A continuous curding machine for tofu products, comprising:
   a conveyor belt that transports coagulating soymilk with coagulant and is integrally formed as one conveyor belt;
   a concave member having a plane portion and vertical portions perpendicular to the plane portion, the vertical portions facing each other, and disposed underneath the belt; and
   an upstream sluice disposed on the belt at an upstream side of the concave member, for stemming the soymilk,
   wherein the belt has a width longer than that of the plane portion of the concave member to form a bottom plane extending along the plane portion and two sides extending along the vertical portions and to contact an inside surface of said concave member when the belt is located in the concave member; and
   the upstream sluice is arranged to push down and press the belt along the inside surface of the concave member.

2. A continuous curding machine for tofu products according to claim 1, wherein the conveyor belt is a cloth, and at least one surface of the conveyor belt, where soymilk is supplied, is resin coated.

3. A continuous curding machine for tofu products according to claim 2, wherein said concave member has an impermeable structure and is made of at least one of metal and stainless steel, and said cloth has an impermeable and wicking of aramid fiber and at least one wetted surface thereof is fluoro-resin coated.

4. A continuous curding machine for tofu products according to claim 1, wherein two bottom corners of said belt folded to shape in a concave are made thinner.

5. A continuous curding machine for tofu products according to claim 1, further comprising axis rollers disposed at a vicinity of the concave member,
   wherein said belt is an endless belt that is rotated by the axis rollers, and is flattened at a position of said axis rollers disposed in the vicinity.

6. A continuous curding machine for tofu products according to claim 5, wherein two ends of said axis rollers are tapered to flat the belt relative to a width direction thereof.

7. A continuous curding machine for tofu products according to claim 1, wherein the plane portion and the vertical portions are integrally formed as one concave member.

* * * * *